United States Patent [19]
Lathers

[11] 3,749,440
[45] July 31, 1973

[54] TAILGATE
[75] Inventor: Michael W. Lathers, Bloomfield Hills, Mich.
[73] Assignee: General Motors Corporation, Detroit, Mich.
[22] Filed: Nov. 26, 1971
[21] Appl. No.: 202,222

[52] U.S. Cl............ 296/51, 49/192, 296/57 R, 296/106
[51] Int. Cl............................................ B60j 5/10
[58] Field of Search............ 296/50, 51, 56, 57 R, 296/57 A, 106; 16/147; 49/192, 193

[56] References Cited
UNITED STATES PATENTS

| | | | |
|---|---|---|---|
| 3,612,601 | 10/1971 | Himka et al. | 296/51 |
| 2,936,195 | 5/1960 | Schutte | 296/106 |
| 2,650,388 | 9/1953 | White | 16/147 |
| 457,274 | 8/1891 | Hall | 296/51 |
| 925,739 | 6/1909 | Wright | 296/51 |
| 1,883,473 | 10/1932 | Barrett | 296/51 |
| 3,403,473 | 10/1968 | Navarro | 49/193 |

*Primary Examiner*—Leo Friaglia
*Assistant Examiner*—Leslie J. Paperner
*Attorney*—W. E. Finken et al.

[57] ABSTRACT

A station wagon type vehicle body includes a rear opening whose lower portion is selectively closed by a tailgate. A pair of support arms extend along the vertical edges of the opening when the tailgate is in closed position and have their upper ends pivoted to the vehicle body for swinging movement about a transverse vehicle body axis substantially midway between the upper edge of the opening and the upper edge of the closed tailgate. A first latch mechanism including a pair of first latch members normally extending from the tailgate into engagement with the support arms is actuatable to disengage these latch members with the support arms and allow swinging tailgate movement in a drop-gate mode to a first open position about pintle portions of a pair of second latch members associated with a second latch mechanism. The second latch members normally extend from the tailgate through the lower ends of the support arms into engagement with the vehicle body and move out of engagement with the vehicle body upon actuation of the second latch mechanism to allow upward swinging movement of the support arms and tailgate movement in a lift-gate mode to a generally vertical second open position. The support arms straddle the upper portion of the opening with the tailgate in the second open position and allow full access to the opening while concomitantly minimizing the distance the tailgate extends outwardly of the adjacent vehicle body confines. Linkages connecting an actuator handle to the latch mechanisms include lost motion connections such that the handle is moved in opposite directions to selectively actuate either latch mechanism.

5 Claims, 3 Drawing Figures

INVENTOR.
Michael W. Lathers
BY
Herbert Furman
ATTORNEY

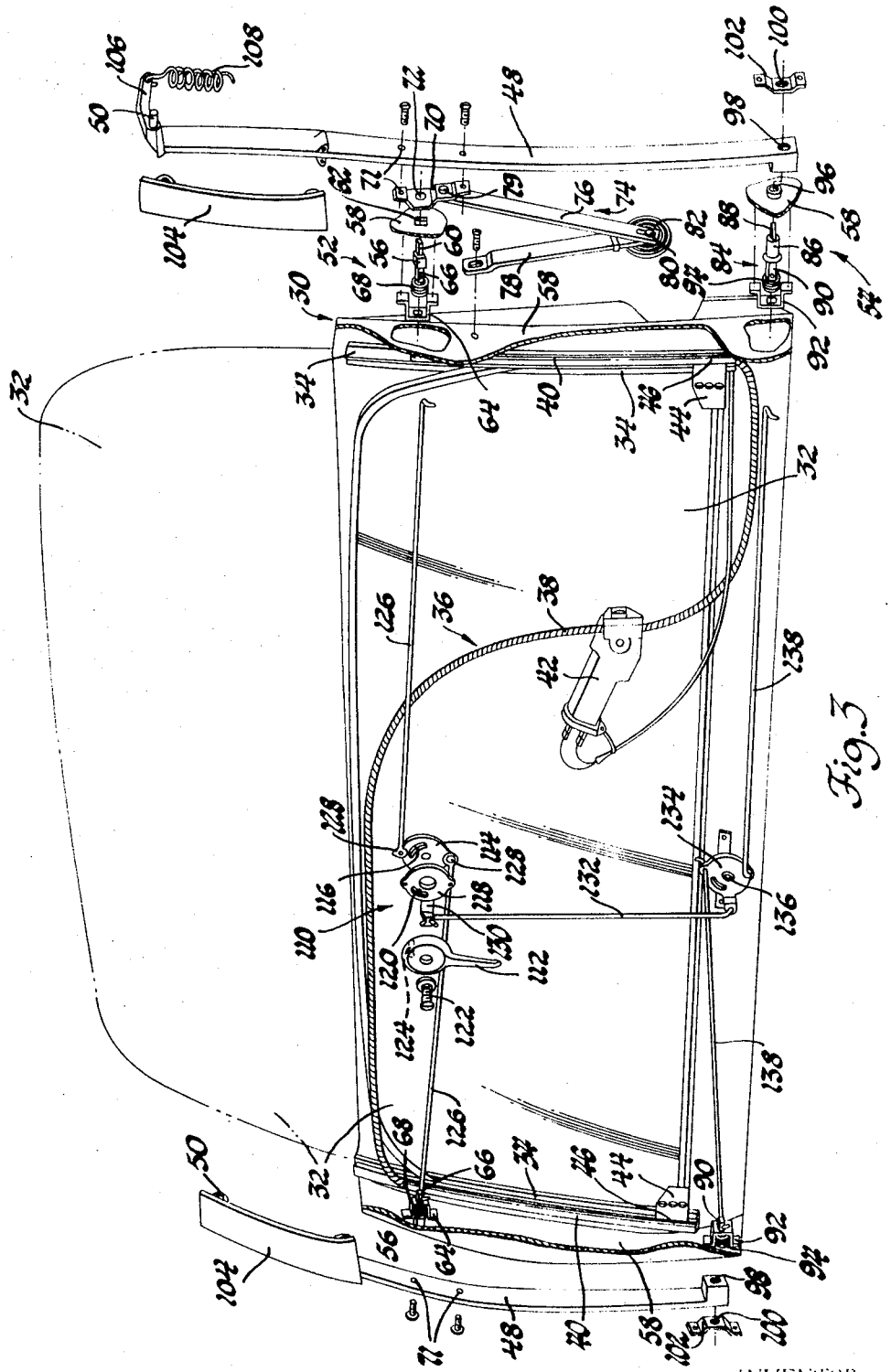

TAILGATE

BACKGROUND OF THE INVENTION

This invention relates generally to tailgates for station wagon type vehicle bodies.

Station wagon type vehicle bodies conventionally include a tailgate for closing the lower portion of a rear opening to a third vehicle seat or to a rear cargo area of the occupant compartment. A rear window conventionally closes the upper portion of the opening and allows the vehicle driver to observe the roadway rearward of the vehicle by way of a conventional rear view mirror. In one type of tailgate, the rear window is movable downwardly to within the tailgate such that the tailgate is movable to a lower open position about a lower transverse vehicle body axis in what is conventionally referred to as a drop-gate mode. It is also possible for the upper and lateral edges of the rear window to be bounded by an inverted generally U-shaped frame. The lower ends of the frame are attached to the upper lateral edges of the tailgate while the laterally extending base portion of the frame is pivoted to the vehicle body at the upper edge of the opening to support the tailgate for swinging movement to an upper open position in what is conventionally referred to as a lift-gate mode.

Since certain individuals may have a preference for a tailgate that moves in either a lift-gate mode or a drop-gate mode, the United States patent application of Himka et al. Ser. No. 5,788, filed on Jan. 26, 1970 and assigned to the assignee of the present invention, now Pat. No. 3,612,601, discloses a tailgate which selectively operates in either a lift-gate mode or a drop-gate mode. Generally, the dual movement is accomplished by extending the legs of the inverted U-shaped frame that bounds the upper and lateral sides of the rear window and pivoting the lower edge of the tailgate to the lower ends of these legs for tailgate movement to a lower first open position in drop-gate mode upon actuation of a suitable first latch mechanism. Actuation of a suitable second latch mechanism allows pivoting movement of the frame and tailgate about the upper edge of the opening and movement of the tailgate to an upper second open position in the lift-gate mode. In the open position of the lift-gate mode, this tailgate extends outwardly of the adjacent vehicle body confines, either upwardly or rearwardly or some combination of the two, for a distance substantially equal to the vertical height of the opening. When the vehicle is in certain confined areas, such as within a garage with the garage door in an overhead open position or in a closed position rearward of the tailgate, the distance the tailgate extends outwardly in the lift-gate open position is limited.

SUMMARY OF THE INVENTION

An object of this invention is to provide a station wagon type vehicle body with an improved tailgate operable in both a lift-gate mode and a drop-gate mode such that the distance the tailgate extends outwardly of the adjacent vehicle body confines in the open position of the lift-gate mode is minimized.

In carrying out this object, this invention utilizes a pair of support arms that extend along the vertical edges of the rear vehicle body opening when the tailgate is in a closed position. The upper ends of the support arms are pivoted to the vehicle body about a transverse vehicle body axis located substantially midway between the upper edge of the opening and the upper edge of the closed tailgate. Intermediate portions of the support arms are respectively engaged by a pair of latch members of a first latch mechanism to fix the tailgate against downward swinging movement in drop-gate mode about pivotal connections of the lower tailgate edge to the lower ends of the support arms, while the first latch mechanism is actuatable to disengage these latch members with the support arms to allow such movement. A pair of second latch members associated with a second latch mechanism extend from the lower ends of the support arms into engagement with the vehicle body to maintain the support arms at the vertical edges of the opening when the tailgate is in closed position and when operating in the drop-gate mode. The second latch mechanism is actuatable to disengage the second latch members with the vehicle body and allow upward pivoting of the arms and tailgate in a lift-gate mode to a generally vertical open position where the support arms straddle the upper portion of the opening to allow full access to the opening while concomitantly minimizing the distance the tailgate extends outwardly of the adjacent vehicle body confines.

In the preferred embodiment of the invention, the second latch members include pintle portions providing the pivotal connections between the tailgate and lower ends of the support arms during movement in the drop-gate mode. Linkages connecting an actuator handle to the latch mechanisms include lost motion connections such that the handle is movable in opposite directions to selectively actuate either the first or second latch mechanism and allow tailgate movement in either the drop-gate or lift-gate mode.

BRIEF DESCRIPTION OF THE DRAWINGS

An understanding of the present invention is readily apparent from the following description of the preferred embodiment and the drawings in which:

FIG. 3 is an enlarged view of the tailgate shown in FIGS. 1 and 2, with the outer panel of the tailgate broken away to show an actuator mechanism for actuating first and second latch mechanisms controlling the tailgate movement, and with the right-hand portions of the latch mechanisms and the support arms shown in an exploded manner adjacent the lateral sides of the tailgate.

DESCRIPTION OF THE PREFERRED EMBODIMENT

Figure 1:
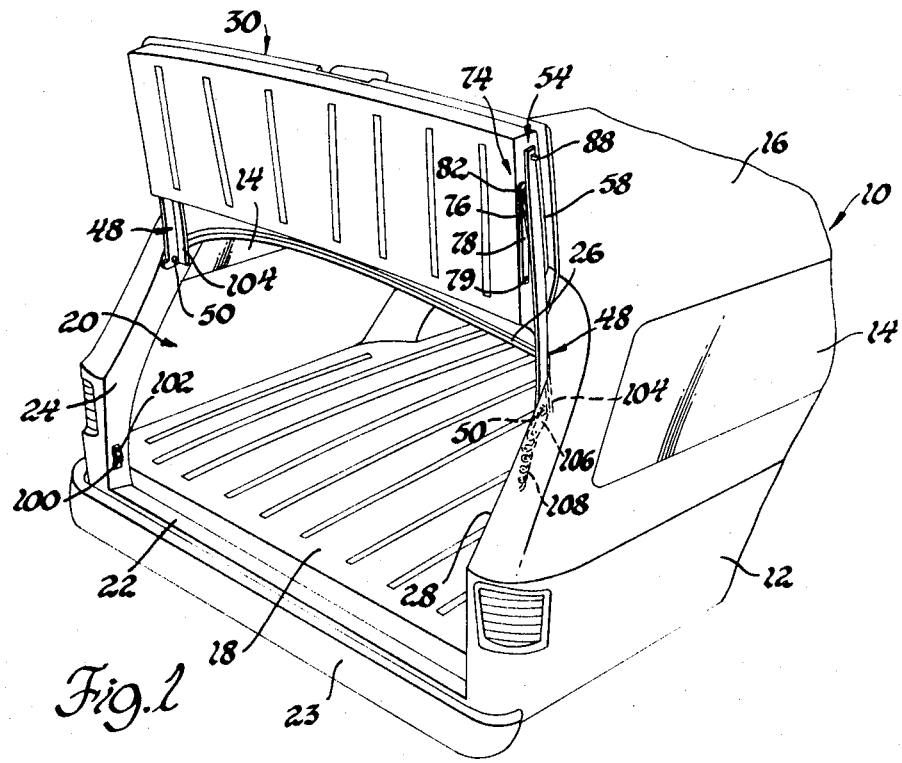
FIG. 1 is a perspective view of the rear portion of a station wagon type vehicle body including a tailgate, according to this invention, shown moved upwardly from a closed position to a first open position in a lift-gate mode.
Figure 2:
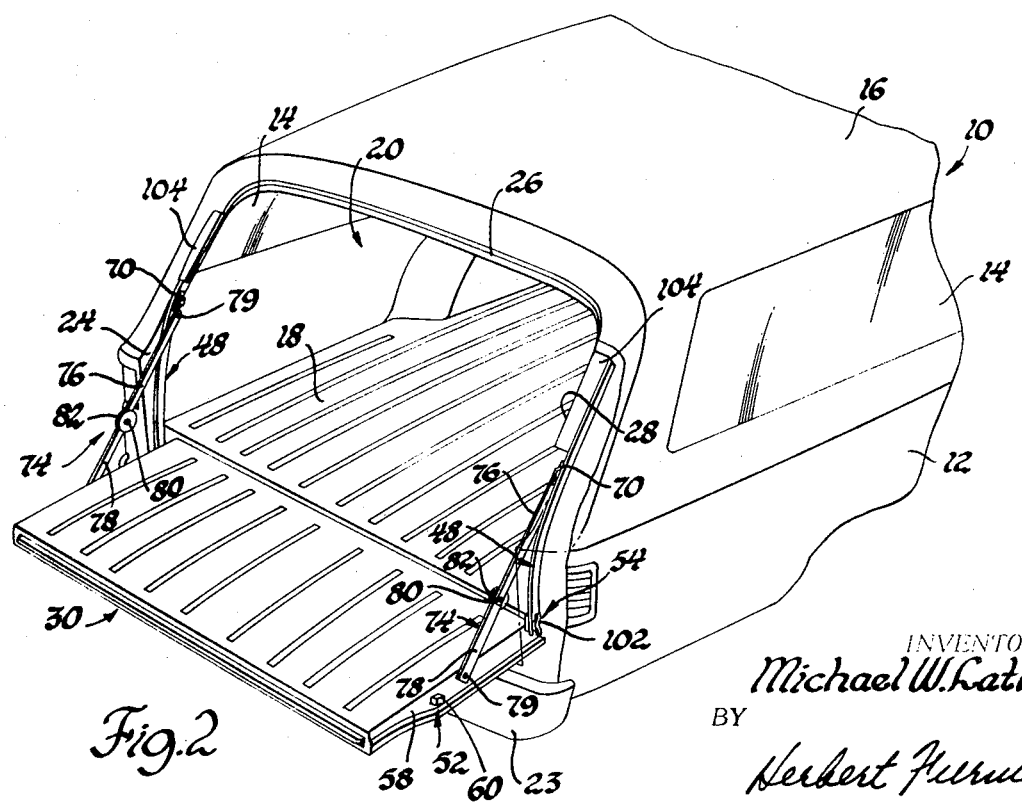
FIG. 2 is a partially broken away view similar to FIG. 1 showing the tailgate moved downwardly from closed position to a second open position in a drop-gate mode.

Referring to FIGS. 1 and 2 of the drawings, a station wagon type vehicle body generally indicated by 10 includes conventional rear quarter panels 12, rear side windows 14, and a conventional roof 16 that cooperate with a filler panel 18 to define the rear cargo portion of a conventional occupant compartment generally indicated by 20. FIG. 1 shows a plate 22 that extends laterally of vehicle body 10 slightly above and forward of a rear bumper 23 and slightly below and rearward of the aft end of filler panel 18. The opposite ends of plate 22 are connected to the lower ends of a pair of vertically extending plates 24 that cooperate with plate 22 and the rear edge 26 of roof 16 to define a rear opening 28 to occupant compartment 20.

A rectangular tailgate, according to this invention, is generally indicated by 30 and is positioned in a closed position in the lower portion of opening 28 in a conventional manner, the closed position not being shown. The tailgate mounts a rear window 32 for movement between the lower solid line indicated stored position of FIG. 3 and the upper phantom line indicated raised position closing the upper portion of opening 28 above the closed tailgate. The lateral edges of the rear window 32 are received by a pair of opposed tracks 34 to mount the window for movement between these positions. A drive cable generally indicated by 36 includes an outer sheathing 38 whose opposite ends communicate with upper and lower ends of a pair of slotted guide tubes 40 respectively mounted on the tracks 34 in a suitable manner. An electric drive motor 42 includes a suitable rotatable friction drive member, not shown, that extends through a cutaway portion of the sheathing 38 to drive an elongated cable within the sheathing. A pair of attachment plates 44 are suitably secured to the lower lateral edges of window 32 and include flanges 46 that extend through the slots in guide tubes 40 for attachment in a suitable manner to the opposite ends of the cable within sheathing 38. The drive motor reciprocates the cable within sheathing 38 in opposite directions to raise and lower the attachment plates as the window 32 is consequently carried upwardly and downwardly within tracks 34 in a corresponding manner.

A pair of generally elongated support arms 48 have first ends pivoted to upper portions of plates 24 by respective pins 50, FIG. 1. The support arms 48 extend downwardly from pins 50 generally along plates 24 when the tailgate 30 is in closed position and a first latch mechanism generally indicated by 52, FIG. 3, selectively prevents tailgate movement in a drop-gate mode to the FIG. 2 open position, as will be described, while it is selectively actuatable to allow such movement. Likewise, a second latch mechanism 54 selectively secures the support arms 48 in the positions extending along plates 24 as in FIG. 2, while it is selectively actuatable to allow upward pivoting movement of the support arms and the tailgate 30 to the FIG. 1 open position in a lift-gate mode. During lift-gate movement of the tailgate, the axis of pivotal movement is about pins 50. These pins are located substantially midway between the rear roof edge 26 defining the upper edge of opening 28 and the upper edge of the tailgate 30 in the closed position. Consequently, in the FIG. 1 open position of the lift-gate mode, the support arms 48 straddle the upper portion of the opening 28 to allow full access to the occupant compartment 20 while concomitantly minimizing the distance the tailgate extends outwardly of the adjacent vehicle body confines.

Referring particularly now to FIG. 3, the first latch mechanism 52 includes a pair of latch bolts 56 positioned inboard of the respective lateral edge panels 58 of the tailgate. The bolts 56 include latching noses 60 that extend outwardly through the edge panels through apertures 62. A pair of generally U-shaped brackets 64 have their legs suitably attached to the inner sides of edge panels 58 and their base portions apertured to receive inboard apertured attachment portions 66 of the bolts 56. Helical springs 68 bias the bolts 56 outwardly such that the latching noses 60 are biased outwardly through the apertures 62 in the edge panels 58. Latching brackets 70 are suitably mounted on intermediate portions of support arms 48, as by suitable pins extending through aligned pairs of apertures 71 in the brackets and the support arms, and include apertures 72 for receiving the latching noses 60 of the bolts 56 to fix the upper portion of the tailgate 30 relative to the support arms 48 and prevent downward swinging tailgate movement in the drop-gate mode. Counterbalance linkages generally indicated by 74 include links 76 and 78 with first ends pivoted to the latching brackets 70 and the edge panels 58 of the tailgate by pins 79, and with their opposite ends pivoted to each other by pins 80 such that torsion springs 82 provide a counterbalancing effect as the linkages move from the folded positions of FIG. 3 to the straightened positions of FIG. 2 during drop-gate movement of the tailgate.

The second latch mechanism 54 includes latch bolts 84 with pintle portions 86, latching noses 88, and apertured attachment portions 90. Generally U-shaped brackets 92 have their legs attached to the inner sides of edge panels 58 with the attachment portions of the bolts 84 extending through apertured base portions of the brackets. Springs 94 extend between the bolts and the base portions of the brackets 92 to bias the bolts outwardly such that the pintle portions 86 extend out from flanged apertures 96 in the edge panels 58 and are received by apertures 98 in the lower embossed ends of support arms 48. The latching noses 88 extend through the apertures 98 and are received by apertures 100 in brackets 102 suitably mounted on the lower ends of the plates 24 defining the lateral edges of opening 28. During drop-gate movement of the tailgate 30, the pintle portions 86 of bolts 84 and the flanged apertures 96 of edge panels 58 pivotally support the tailgate while the latching noses 88 secure the lower ends of support arms 48 relative to the vehicle body. Actuation of the second latch mechanism, in a manner to be described, moves the bolts 84 inwardly to disengage latching noses 88 with brackets 100 and allow upward pivoting of support arms 48 and tailgate movement in the lift-gate mode. Trim panels 104 suitably mounted on the upper ends of support arms 48 pivot along with the support arms during the lift-gate movement, while occupying the FIG. 2 position when the tailgate is in closed position or operating in the drop-gate mode. On the opposite side of pins 50 from trim panels 104, the support arms 48 include laterally extending flanges 106 for attaching respective ends of counterbalance springs 108 whose other ends are suitably secured to the vehicle body to provide the required counterbalancing during movement of the tailgate in lift-gate mode.

An actuator mechanism generally indicated by 110 in FIG. 3 includes an actuator handle 112, a first actuating member 114 with an annular slot 116, and a second actuating member 118 with an annular slot 120. The outer panel of the tailgate is located between handle 112 and the second actuating member 118 and includes an aperture receiving a bolt 122 also received within aligned apertures in the handle and the first and second actuating members. A control pin 124 on handle 112 is received within the upper ends of slots 116 and 120 such that counterclockwise movement of handle 112 rotates the first actuating member 114 counterclockwise while the second actuating member 118 remains stationary. Elongated control links 126 have their inboard ends pivoted to actuating member 114 by pins 128 such that they move inwardly during the counterclockwise movement of member 114. The outboard ends of links 126 have offset portions received by the apertures in the attachment portions 66 of bolts 56. Consequently, the inward movement of the links 126 moves bolts 56 inwardly against the bias of springs 68 and moves the latching noses 60 out of engagement with latching brackets 70 to allow drop-gate movement of the tailgate. The second actuating member 118 includes a bracket 130 attaching the upper end of a control link 132 whose lower end is suitably secured to a direction transferring member 134. A pin 136 pivots member 134 to the tailgate and a pair of control links 138 have their inboard ends attached to member 134. The outboard ends of control links 138 have offset portions received by the apertures in the attachment portions 90 of bolts 84. Clockwise movement of handle 112 causes control pin 124 to pivot the second actuating member 118 clockwise while actuating member 114 remains stationary. As actuating member 118 rotates clockwise, it pulls link 132 upwardly and rotates member 134 clockwise to pull links 138 inwardly and release the latching noses 88 from the vehicle body mounted brackets 102 such that tailgate movement in the lift-gate mode is possible.

The invention thus provides an improved tailgate.

What is claimed is:

1. In a station wagon type vehicle body defining a generally rectangular rear opening to the vehicle body occupant compartment, the combination comprising, a generally rectangular tailgate having a smaller height than the opening and positionable in a closed position closing a lower portion of the opening, a pair of elongated support arms oriented in generally vertically extending positions along the vertical edges of the opening when the tailgate is in closed position, first means pivoting the upper ends of the support arms to the vehicle body at the opposite sides of the opening for swinging movement about a transverse vehicle body axis located substantially midway between the upper edge of the opening and the upper edge of the tailgate in closed position, second means pivoting the lower edge of the tailgate to the lower ends of the support arms for downward swinging movement in a drop-gate mode to a first open position, first latch means normally fixing the tailgate relative to the support arms to prevent tailgate movement in the drop-gate mode and selectively actuatable to allow such movement, and second latch means normally securing the lower ends of the support arms to the vehicle body to secure the support arms in the generally vertically extending positions when the tailgate is closed and when moving in the drop-gate mode, the second latch means being actuatable to allow upward swinging movement of the support arms about their upper ends and movement of the tailgate in a lift-gate mode to a generally vertically oriented second open position where the support arms straddle the upper portion of the opening to allow full access to the opening while concomitantly minimizing the distance the tailgate extends outwardly of the adjacent vehicle body confines.

2. In a station wagon type vehicle body defining a generally rectangular rear opening to the vehicle body occupant compartment, the combination comprising, a generally rectangular tailgate having a smaller height than the opening and positionable in a closed position closing a lower portion of the opening, a pair of elongated support arms oriented in generally vertically extending positions along the vertical edges of the opening when the tailgate is in closed position, first means pivoting the upper ends of the support arms to the vehicle body at the opposite sides of the opening for swinging movement about a transverse vehicle body axis located substantially midway between the upper edge of the opening and the upper edge of the tailgate in closed position, second means pivoting the lower edge of the tailgate to the lower ends of the support arms for downward swinging movement in a drop-gate mode to a first open position, first latch means normally fixing the tailgate relative to the support arms to prevent tailgate movement in the drop-gate mode and selectively actuatable to allow such movement, and second latch means including latch members extending between the vehicle body and the lower ends of the support arms along the axis of the second pivoting means to secure the support arms in the generally vertically extending positions when the tailgate is in closed position and when moving in the drop-gate mode, the second latch means being actuatable to disengage the latch members from the vehicle body to allow upward swinging movement of the support arms about their upper ends and movement of the tailgate in a lift-gate mode to a generally vertically oriented second open position where the support arms straddle the upper portion of the opening to allow full access to the opening while concomitantly minimizing the distance the tailgate extends outwardly of the adjacent vehicle body confines.

3. The combination of claim 2 wherein the latch members of the second latch means and the second pivoting means are integral.

4. In a station wagon type vehicle body defining a generally rectangular rear opening to the vehicle body occupant compartment, the combination comprising: a generally rectangular tailgate having a smaller height than the opening and positionable in a closed position closing a lower portion of the opening; a pair of elongated support arms oriented in generally vertically extending positions along the vertical edges of the opening when the tailgate is in closed position; first means pivoting the upper ends of the support arms to the vehicle body at the opposite sides of the opening for swinging movement about a transverse vehicle body axis located substantially midway between the upper edge of the opening and the upper edge of the tailgate in closed position; second means pivoting the lower edge of the tailgate to the lower ends of the support arms for downward swinging movement in a drop-gate mode to a first open position; first latch means including latch members extending between the tailgate and support arms to normally fix the tailgate relative to the support arms and prevent tailgate movement in the drop-gate mode, the first latch means being selectively actuatable to disengage the latch members from the support arms and allow tailgate movement in the drop-gate mode; second latch means including latch members extending between the support arms and the vehicle body along the axis of the second pivoting means to secure the support arms in the generally vertically extending positions when the tailgate is in closed position and when moving in the drop-gate mode, the second latch means being actuatable to disengage the latch members from the vehicle body and allow upward swinging movement of the support arms about their upper ends and movement of the tailgate in a lift-gate mode to a generally vertically oriented second open position where the support arms straddle the upper portion of the opening to allow full access to the opening while concomitantly minimizing the distance the tailgate extends outwardly of the adjacent vehicle body confines; and an actuator mechanism including lost motion means connecting the first and second latch means to an actuator handle such that the handle is selectively movable in opposite directions to actuate either the first or second latch means and allow either the drop-gate or lift-gate movement of the tailgate.

5. The combination of claim 4 wherein the upper ends of the support arms mount respective trim panels.

* * * * *